United States Patent

[11] 3,603,889

[72] Inventors Michael Charles Stevens
Broxbourne;
Brian David Swatton, Harlow, both of,
England
[21] Appl. No. 816,587
[22] Filed Apr. 16, 1969
[45] Patented Sept. 7, 1971
[73] Assignee A. C. Cossor Limited
Essex, England
[32] Priority May 8, 1968
[33] Great Britain
[31] 21766/68

[54] PHASE COMPARATOR USING FLIP-FLOP CIRCUITS
4 Claims, 4 Drawing Figs.

[52] U.S. Cl. .................................................... 328/133, 307/232, 307/233, 307/295, 328/155
[51] Int. Cl. .................................................... H03b 3/04, H03d 13/00, H03k 9/06
[50] Field of Search .......................................... 307/232, 233, 295; 328/109, 110, 133, 134, 155

[56] References Cited
UNITED STATES PATENTS 3,381,220 4/1968 Burr .............................. 324/82
3,431,509 3/1969 Andrea .......................... 328/133 X

*Primary Examiner*—Stanley D. Miller, Jr.
*Attorney*—Roberts, Cushman & Grover

ABSTRACT: A bistable flip-flop is set and reset respectively by two signals whose phases are to be compared and provides pulses of width determined by the phase difference. In order to prevent erroneous indication of phase synchronism when one signal frequency is an integral multiple of the other, a frequency comparator blocks the flip-flop when the frequencies are different and itself provides the said pulses, instead of the flip-flop.

PHASE COMPARATOR USING FLIP-FLOP CIRCUITS

This invention relates to phase comparators and concerns a comparator which will provide pulses of width proportional to the phase error between two signals, such pulses being available in two channels according to the sign of the phase error, if required. The object of the invention is to provide a comparator which will not erroneously indicate phase synchronism when one signal is a frequency which is an integral multiple of the frequency of the other.

According to the invention there is provided a phase comparator comprising a bistable circuit having an input for setting the bistable circuit at an instant determined by the phase of one of two signals and an input for resetting the bistable circuit at an instant determined by the phase of the other of the two signals, a frequency comparator arranged to compare the frequencies of the two signals and, when the frequencies are different, to supply output pulses in lieu of those supplied by the bistable circuit and simultaneously to inhibit setting of the bistable circuit.

Figure 1:
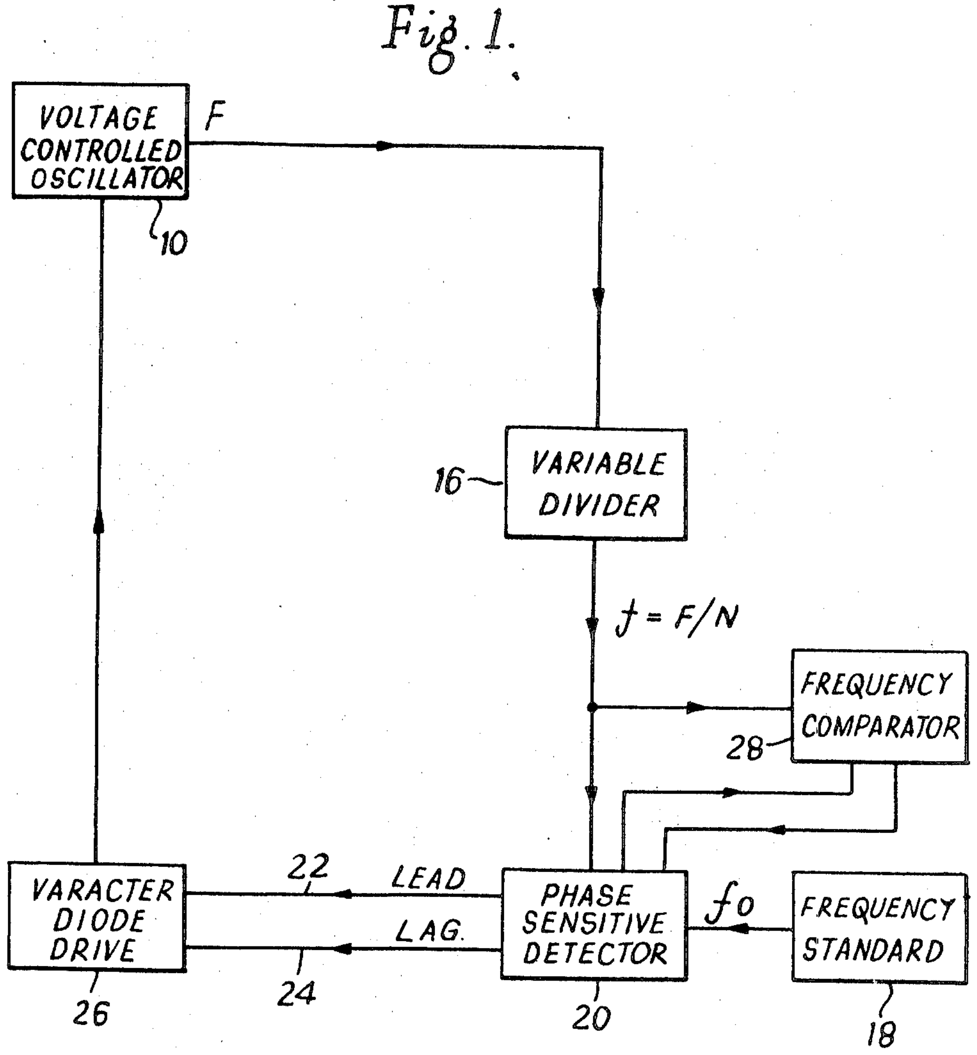
Figure 2:
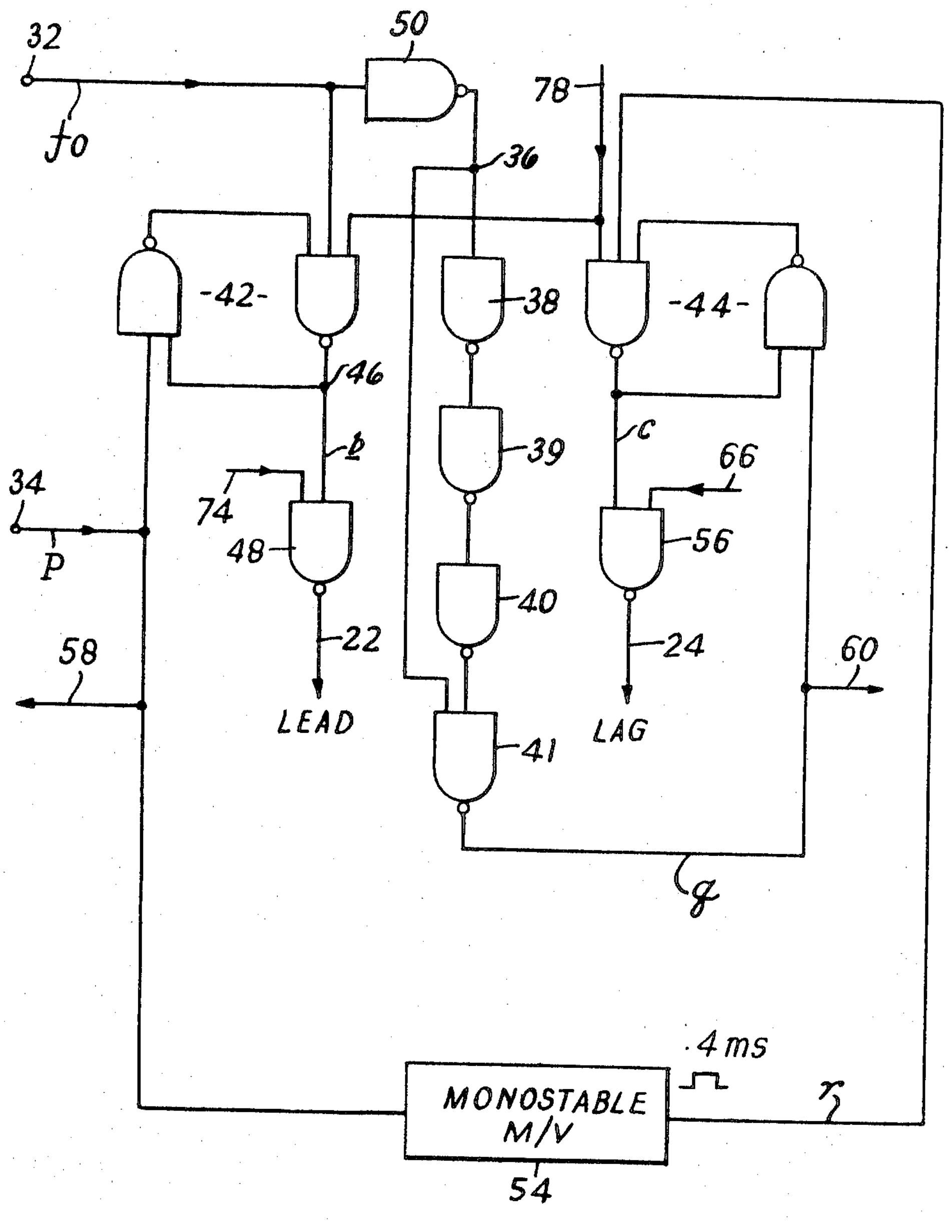
Figure 2A:
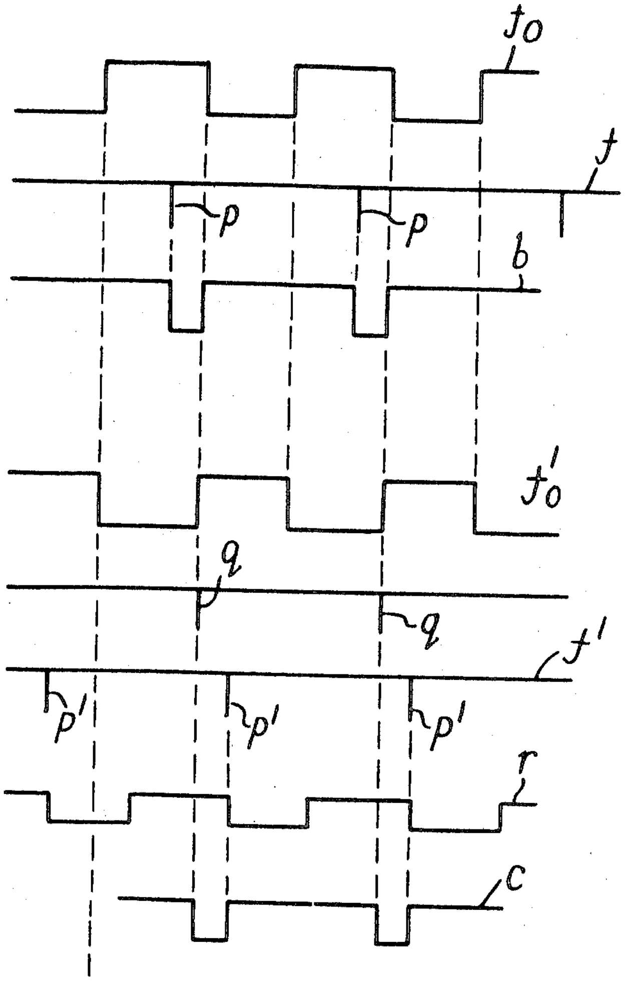
Figure 3:
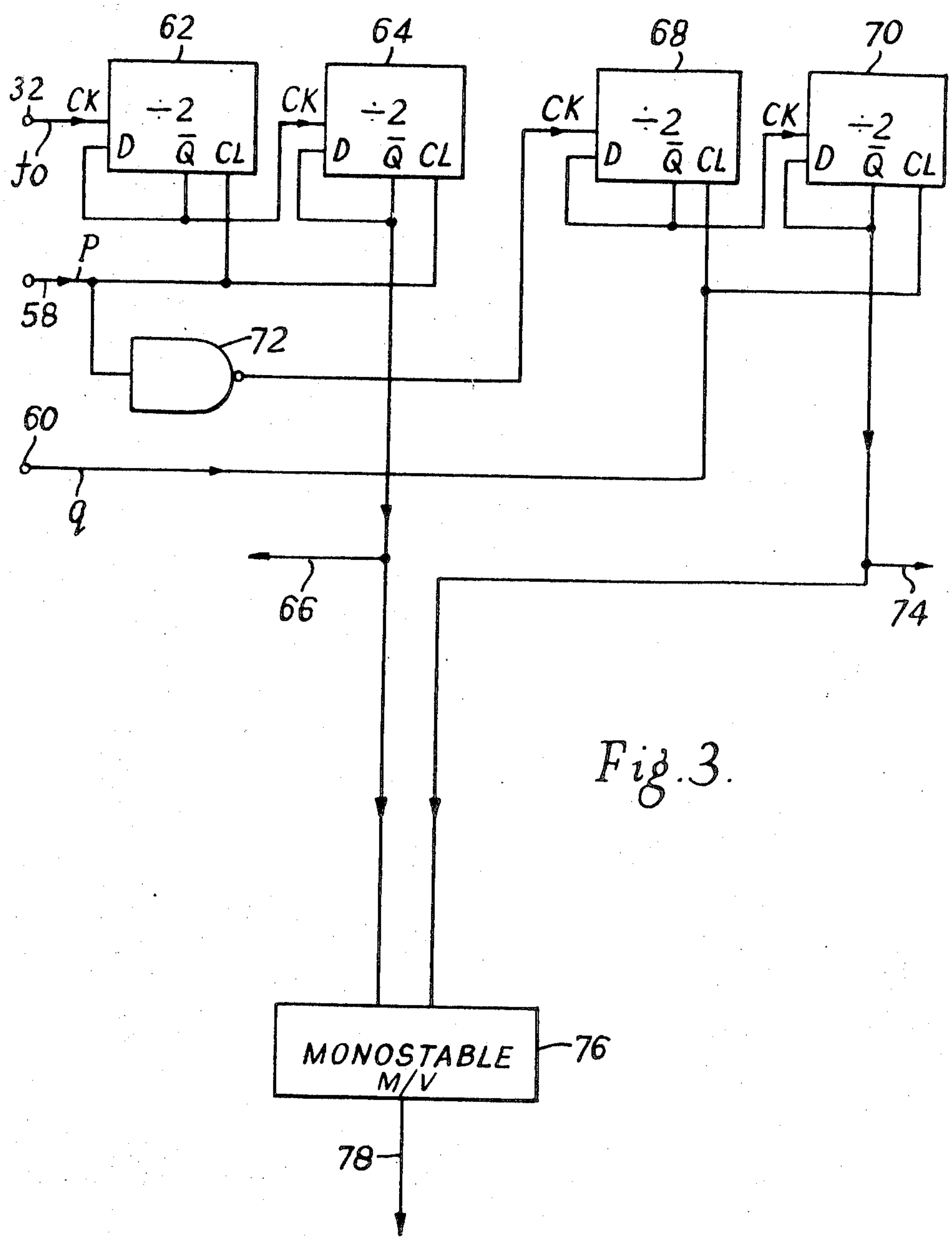

The invention will be described in more detail, by way of example, with reference to the accompanying drawings, in which:

FIG. 1 is a block diagram of a frequency licking system embodying a phase sensitive detector and frequency comparator according to the invention, FIGS. 2 and 3 are diagrams of the said detector and comparator respectively, and FIG. 2*a* shows explanatory waveforms.

In FIG. 1 a voltage controlled oscillator 10 provides a signal at frequency F and a variable divider 16 divides F by N to produce *f* which is required to be equal to *fo*, say 1 kHz., provided by a frequency standard 18. To achieve *f*=*fo* these two signals are applied to a phase sensitive detector 20. If *f* leads *fo* the detector 20 produces pulses on an output 22 of width proportional to the phase error. If *f* lags *fo* pulses are similarly produced on a lag output 24.

The frequency of the oscillator 10 is controlled in a known way by means of a varactor diode drive circuit 26 which includes a storage capacitor. Pulses in one of the lines 22 and 24 add charge to the capacitor and pulses in the other line subtract charge from the capacitor to vary the voltage on the varactor diode. In order to prevent the system locking with *f*=*nfo* where *n* is an integer a frequency comparator 28 for comparing *f* and *fo* is interposed between the divider 16 and the detector 20.

The system thus locks with *F*=*Nfo* and *F* can be varied in steps of 1 kHz. by varying *N*, whose value can be set up in any convenient way.

The phase sensitive detector 20 is shown more fully in FIG. 2. The signal *fo* is applied to a terminal 32 as a symmetrical square wave, shown in FIG. 2*a*. The signal *f* is applied to a terminal 34 as a short negative pulse *p* (FIG. 2*a*) of duration approximately 30 ns.

The detector of FIG. 2 comprises two bistables 42 and 44 operative respectively when *f* leads and lags *fo*. The situation with *f* leading is illustrated in FIG. 2*a* by unprimed references. The short pulse *p* sets the bistable 42 which resets on the trailing edge of *fo* (If *fo* leads *f* the bistable 42 is never set.). The bistable 42 therefore produces a pulse *b* on its output 46 at level 0 and of duration equal to the lead of *f* on *fo*. The pulse *b* is inverted by a gate 48 whose output is the line 22.

The situation with *f* lagging is illustrated in FIG. 2*a* by primed references where necessary to distinguish from *f* leading, *fo* is inverted by an inverter 50 to produce *fo'* from which short pulses 9 are produced by a circuit which consists of a chain of say four NAND gates 38, 39, 40 and 41, of which the first three act as inverters and the fourth NANDS the output of the third and the output from inverter 50 on terminal 36. When the output from the gate 50 is 0 the output of the third gate 40 is 1. Accordingly when the output from inverter 50 goes to 1, the gate 41 sees two 1's and provides an output of O. However the output of the gate 40 rapidly changes to 0 and so the output of the gate 41 reverts to 1. Four commercially available NAND gates can be used to achieve an output pulse of 30 ns. duration only. These short pulses 9 set the bistable 44. The short pulses *p'* trigger a monostable multivibrator 54 of period 0.4 ms. to produce pulses *r* on whose falling edge the bistable 44 resets, producing output pulses *c* which are inverted by a gate 56 to provide the output on line 24.

If there is no phase error the bistable 42 is simultaneously set and reset and the bistable 44 is never set. However the circuit of FIG. 2 as it stands is capable of indicating no phase error when *f*=*nfo* as already pointed out. To avoid this possibility the frequency comparator of FIG. 3 is provided and makes use of the pulses *p* and 9 available on lines 58 and 60 respectively from the detector of FIG. 2.

Two flip-flops 62 and 64 connected as a divide-by-four counter are used to detect *f*<*fo*. This counter clocks the signal *fo* from line 32 (FIG. 2) and is reset by the pulses *p* on line 58. If $\underline{f} \nless \underline{f}_o$ the flip-flop 62 is cleared before it can clock the flip-flop 64 and the $\bar{Q}$ output of the flip-flop 64 remains at 1. This is not true however if *f*<*fo* and pulses at level 0 appear on the $\bar{Q}$ output and are applied by way of a line 66 to the gate 56 to act in the same way as the pulses *c* from the bistable 44.

In a similar way two flip-flops 68 and 70 are used to detect *f*<*fo*. The flip-flop 68 is clocked by the pulses *p* inverted by an inverter 72 and both flip-flops are reset by the pulses *q* on the line 60. Only if *f*<*fo* does the $\bar{Q}$ output of the flip-flop 70 go to 0 and then the pulses at level 0 are applied by way of a line 74 to the gate 48 to act in the same way as the pulses *b* from the bistable 42.

If *f*=*fo* the time relationships between *fo*, *p* and *q* are such that the counters never clock and reset at the same instant. Otherwise undesirable outputs could be produced occasionally on the lines 66 and 74.

When outputs are being produced on either of the lines 66 and 74 it is important to inhibit operation of the phase sensitive detector. Otherwise pulses on say the line 74 can have their effect negatived by pulses *c* from the bistable 44. Both output lines 66 and 74 are therefore connected to a monostable multivibrator 76 (FIG. 3) which produces a 2 ms. suppression pulse at level 0 on a line 78 whenever a pulse appears in either line 66 or line 74. The suppression pulses are applied to both the bistables 42 and 44 (FIG. 2) to prevent these bistables being set.

Thus until *f*=*fo* the frequency comparator of FIG. 3 provides the pulses on line 22 or line 24 for adjusting the frequency of the oscillator 10 but when *f*=*fo* the phase sensitive detector of FIG. 2 takes over and effects control in accordance with the relative phases of *f* and *fo*.

We claim:

1. In combination, for comparing the phases of first and second periodic signals, a first bistable flip-flop having a first input responsive to said first signal for setting said flip-flop at an instant determined by the phase of said first signal, and a second input responsive to said second signal for resetting said flip-flop at an instant determined by the phase of said second signal, a first output line connected to said flip-flop to supply first output pulses as said flip-flop sets and resets, a second flip-flop having a first input responsive to said second signal for setting said second flip-flop at an instant determined by the phase of said second signal, and a second input responsive to said first signal for resetting said second flip-flop at an instant determined by the phase of said second signal, a second output line connected to said second flip-flop to supply second output pulses as said flip-flop sets and resets, a frequency comparator comprising first comparing means for providing first further output pulses when said first signal has a higher frequency than said second signal and second comparing means for providing second further output pulses when said second signal has a higher frequency than said first signal, means for applying said first further output pulses to said first output line, and means for applying said second further output pulses to said second output line, and inhibit means being responsive to both said first further output pulses and said second further output pulses for preventing both said first and second flipeflops setting.

2. The combination as in claim 1, wherein said first signal consists of short pulses and said second signal consists of broad pulses, said first flip-flop setting in response to a short pulse occurring in front of the leading edge of a broad pulse and resetting on the leading edge of a broad pulse, the combination further comprising means for generating second short pulses from the leading edges of said broad pulses and means for stretching the first-said short pulses to generate second broad pulses, said second flip-flop setting in response to a second short pulse occurring in front of the leading edge of a second broad pulse and resetting on the leading edge of a second broad pulse.

3. The combination as in claim 1, wherein said signals consist of pulses and each said comparing means comprises two flip-flops connected as a divide-by-four counter to divide the pulses in one of said signals and to be reset by the pulses in other of said signals, the second flip-flop in each said comparing means providing the corresponding further output pulses when this flip-flop sets and resets.

4. A frequency locking system comprising the combination as in claim 1, a voltage controlled oscillator, means for dividing the output of said oscillator by N to provide one of said signals, a frequency standard *fo* providing the other of said signals, and means responsive to pulses in said first and second output lines for increasing and decreasing the control voltage to said oscillator to maintain the frequency thereof equal to *Nfo*.